United States Patent [19]

Fujimoto et al.

[11] Patent Number: 5,274,487
[45] Date of Patent: Dec. 28, 1993

[54] PHOTONIC SWITCHING SYSTEM

[75] Inventors: Nobuhiro Fujimoto, Ebina; Hiroyuki Rokugawa, Kawasaki, both of Japan

[73] Assignee: Fujitsu Limited, Kawasaki, Japan

[21] Appl. No.: 634,422

[22] Filed: Dec. 27, 1990

[30] Foreign Application Priority Data

Dec. 29, 1989 [JP] Japan ................................. 1-340406
Jan. 17, 1990 [JP] Japan ................................. 2-007824

[51] Int. Cl.⁵ ...................... H04B 10/20; H04J 14/02
[52] U.S. Cl. ................................... 359/117; 359/120;
          359/124; 359/128; 359/131; 385/7; 385/16
[58] Field of Search .............. 359/117, 120, 121, 124,
          359/128, 131, 129, 305, 308, 309, 154, 163, 123;
          385/7, 16, 17, 24, 14

[56]                References Cited
U.S. PATENT DOCUMENTS

| | | | |
|---|---|---|---|
| 4,556,290 | 12/1985 | Roulot | 359/309 |
| 4,642,804 | 2/1987 | Personick | 359/114 |
| 4,773,063 | 9/1988 | Hunsperger et al. | 359/130 |
| 4,798,435 | 7/1989 | Fujiwara et al. | 385/17 |
| 4,845,703 | 7/1989 | Suzuki | 359/117 |
| 4,873,681 | 10/1989 | Arthurs et al. | 359/124 |
| 5,009,477 | 4/1991 | Alferness et al. | 385/17 |

FOREIGN PATENT DOCUMENTS

| | | |
|---|---|---|
| 161486 | 2/1983 | Japan . |
| 161487 | 6/1983 | Japan . |
| 161488 | 7/1983 | Japan . |
| 161489 | 11/1983 | Japan . |
| 172841 | 2/1985 | Japan . |
| 223807 | 3/1986 | Japan . |
| 108229 | 2/1987 | Japan . |
| 51895 | 3/1987 | Japan . |
| 212631 | 4/1987 | Japan . |
| 212632 | 11/1987 | Japan . |
| 1-49593 | 1/1989 | Japan . |
| 72125 | 3/1989 | Japan . |
| 1-79922 | 7/1989 | Japan . |

OTHER PUBLICATIONS

IBM technical Bulletin, WDMA network, Mar. 1990 all.
Aida et al., "Optical Protection Switches for Trunk Transmission Systems", IEEE International Conference on Communications '99, Conference Record vol. 1 of 3, Jun., 1988.
Huang et al., "Fast Multicasting 4×4 Photonic Space Switch Utilizing Acousto-Optic Bragg Cells", Fourteenth European Conference on Optical Communication (ECOC 88), Part 1, Sep., 1988.
Akiyama et al., "A Proposal of Space and Wavelength Division Composite Optical Switching System", Optical Switching Study Group Material of the Electronic Information Communication Society, Feb., 1989.

*Primary Examiner*—Richard E. Chilcot, Jr.
*Assistant Examiner*—Rafael Bacares

[57]                ABSTRACT

A photonic switching system includes an optical link conversion board having a first end and a second end opposite to the first end, a plurality of wavelength converter elements arranged at a constant pitch along the first end of the optical link conversion board and converting input optical signals into optical signal components having different wavelengths, a combiner for combining the optical signal components received from the wavelength converter elements into an optical signal which includes optical signal components having a plurality of wavelengths, a plurality of light output parts arranged at a constant pitch along the second end of the optical link conversion board, and a deflector for sequentially deflecting the optical signal from the combiner to an arbitrary one of the light output parts in response to a control signal so that the optical signal at the arbitrary light output part includes a plurality of optical signal components having different wavelengths.

22 Claims, 16 Drawing Sheets

PHOTONIC SWITCHING SYSTEM

BACKGROUND OF THE INVENTION

The present invention generally relates to photonic switching systems, and more particularly to a photonic switching system which cross connects, drops or inserts optical signal links of a plurality of channels.

In a broadband integrated services digital network (ISDN), it is necessary to use a transmission apparatus having a throughput in the order of 42.3 Gbps. In other words, it must be possible to cross connect, drop or insert 155.520 Mbps data of approximately 272 channels.

In a conventional system which cross connects, drops or inserts optical signal links of a plurality of channels, the process of cross connecting, dropping or inserting is carried out after once converting a received optical signal into an electrical signal, and the processed electrical signal is converted back into an optical signal before being transmitted to a terminal, a subscriber or a next node.

When carrying out the process electrically, it is necessary to use a large scale integrated circuit (LSI) having a high performance and capable of processing a large number of signals which are transmitted at a high transmission rate, but the performance of the existing LSI cannot meet such a demand. Even if an LSI having such a high performance were existed, the number of input and output pins would become extremely large, it would be extremely troublesome to equip the system with such an LSI, and required coaxial cables and interconnections would become extremely complex and large in scale. For this reason, there is a problem in that it is extremely difficult to realize by the conventional method a switching system which is capable of switching optical signal links as the signal capacity further increases in the future.

SUMMARY OF THE INVENTION

Accordingly, it is a general object of the present invention to provide a novel and useful photonic switching system in which the problems described above are eliminated.

Another and more specific object of the present invention is to provide a photonic switching system comprising an optical link conversion board having a first end and a second end opposite to the first end, a plurality of wavelength converter elements arranged at a constant pitch along the first end of the optical link conversion board and converting input optical signals into optical signal components having different wavelengths, combiner means for combining the optical signal components received from the wavelength converter elements into an optical signal which includes optical signal components having a plurality of wavelengths, a plurality of light output parts arranged at a constant pitch along the second end of the optical link conversion board, and deflection means for sequentially deflecting the optical signal from the combiner means to an arbitrary one of the light output parts in response to a control signal so that the optical signal at the arbitrary light output part includes a plurality of optical signal components having different wavelengths. According to the photonic switching system of the present invention, it is possible to realize cross connection, drop and insert of optical signals at a high speed with ease.

Still another object of the present invention is to provide a photonic switching system comprising an optical link conversion board having a first end and a second end opposite to the first end, a plurality of variable wavelength light emitting elements arranged at a constant pitch along the first end of the optical link conversion board and emitting optical signals having different wavelengths, combiner means for combining the optical signals received from the light emitting elements into an optical signal which includes optical signal components having a plurality of wavelengths, a plurality of light output parts arranged at a constant pitch along the second end of the optical link conversion board, and deflection means for sequentially deflecting the optical signal from the combiner means to an arbitrary one of the light output parts in response to a control signal so that the optical signal at the arbitrary light output part includes a plurality of optical signal components having different wavelengths. According to the photonic switching system of the present invention, it is possible to realize cross connection, drop and insert of optical signals at a high speed with ease.

A further object of the present invention is to provide a photonic switching system comprising an optical link conversion board having a first end and a second end opposite to the first end, a plurality of variable wavelength light emitting elements arranged at a constant pitch along the first end of the optical link conversion board and emitting optical signal components having different wavelengths, optical star coupler means mixing the optical signal components received from the light emitting elements and outputting a mixed optical signal, and a plurality of multi-wavelength selective filters arranged at a constant pitch along the second end of the optical link conversion board and receiving the mixed optical signal from the optical star coupler means, where each of the multi-wavelength selective filters selectively output an optical signal which includes optical signal components having desired wavelengths out of the wavelengths included in the optical signal components making up the mixed optical signal. According to the photonic switching system of the present invention, it is possible to realize cross connection, drop and insert of optical signals at a high speed with ease.

Another object of the present invention is to provide a photonic switching system comprising a first board group made up of a plurality of mutually parallel first optical link conversion boards, and a second board group made up of a plurality of mutually parallel second optical link conversion boards which are arranged perpendicularly to the first optical link conversion boards of the first board group. Each of the first optical link conversion boards comprise a plurality of wavelength converter elements arranged at a constant pitch along a first end of the optical link conversion board and converting input optical signals into optical signal components having different wavelengths, combiner means for combining the optical signal components received from the wavelength converter elements into an optical signal which includes optical signal components having a plurality of wavelengths, a plurality of light output parts arranged at a constant pitch along a second end of the optical link conversion board opposite to the first end, and deflection means for sequentially deflecting the optical signal from the combiner means to an arbitrary one of the light output parts in response to a control signal so that the optical signal at the arbitrary light output part includes a plurality of optical signal components having different wavelengths. Each of the second optical link conversion boards comprise a plurality of optical receiving parts arranged at a constant pitch along a third end of the second optical link conversion board and receiving the optical signals output from the light output parts of a corresponding one of the first optical link conversion boards, optical star coupler means mixing the optical signals output from the optical receiving parts and outputting a mixed optical signal, and a plurality of wavelength selecting means arranged at a constant pitch along a fourth end of the second optical link conversion board opposite to the third end for receiving the mixed optical signal from the optical star coupler means, where each of the wavelength selecting means output an optical signal including an optical signal component having a single wavelength. Each of the light output parts of a first optical link conversion board are coupled to an optical receiving part of a corresponding one of the second optical link conversion boards. According to the photonic switching system of the present invention, it is possible to realize cross connection, drop and insert of optical signals at a high speed with ease. In addition, it is possible to realize a blocking-free routing of optical signals using only two stages of board groups.

Still another object of the present invention is to provide a photonic switching system comprising a first board group made up of a plurality of mutually parallel first optical link conversion boards, and a second board group made up of a plurality of mutually parallel second optical link conversion boards which are arranged perpendicularly to the first optical link conversion boards of the first board group. Each of the first optical link conversion boards comprise a plurality of variable wavelength light emitting elements arranged at a constant pitch along a first end of the optical link conversion board and emitting optical signals having different wavelengths, combiner means for combining the optical signals received from the light emitting elements into an optical signal which includes optical signal components having a plurality of wavelengths, a plurality of light output parts arranged at a constant pitch along a second end of the optical link conversion board opposite to the first end, and deflection means for sequentially deflecting the optical signal from the combiner means to an arbitrary one of the light output parts in response to a control signal so that the optical signal at the arbitrary light output part includes a plurality of optical signal components having different wavelengths. Each of the second optical link conversion boards comprise a plurality of optical receiving parts arranged at a constant pitch along a third end of the second optical link conversion board and receiving the optical signals output from the light output parts of a corresponding one of the first optical link conversion boards, optical star coupler means mixing the optical signals output from the optical receiving parts and outputting a mixed optical signal, and a plurality of wavelength selecting means arranged at a constant pitch along a fourth end of the second optical link conversion board opposite to the third end for receiving the mixed optical signal from the optical star coupler means, where each of the wavelength selecting means output an optical signal including an optical signal component having a single wavelength. Each of the light output parts of a first optical link conversion board are coupled to an optical receiving part of a corresponding one of the second optical link conversion boards. According to the photonic switching system of the present invention, it is possible to realize cross connection, drop and insert of optical signals at a high speed with ease. In addition, it is possible to realize a blocking-free routing of optical signals using only two stages of board groups.

A further object of the present invention is to provide a photonic switching system comprising a first board group made up of a plurality of mutually parallel first optical link conversion boards, and a second board group made up of a plurality of mutually parallel second optical link conversion boards which are arranged perpendicularly to the first optical link conversion boards of the first board group. Each of the first optical link conversion boards comprise a plurality of variable wavelength light emitting elements arranged at a constant pitch along a first end of the first optical link conversion board and emitting optical signal components having different wavelengths, a first optical star coupler mixing the optical signal components emitted from the variable wavelength light emitting elements and outputting a mixed optical signal, and a plurality of multi-wavelength selective filters arranged at a constant pitch along a second end of the first optical link conversion board opposite to the first end and receiving the mixed optical signal from the first optical star coupler, where each of the multi-wavelength selective filters selectively output an optical signal which includes optical signal components having desired wavelengths out of wavelengths included in the optical signal components making up the mixed optical signal. Each of the second optical link conversion boards comprise a plurality of optical receiving parts arranged at a predetermined pitch along a third end of the second optical link conversion board and receiving the optical signals output from the multi-wavelength selective filters of a corresponding one of the first optical link conversion board, a second optical star coupler mixing the optical signals output from the optical receiving parts and outputting a mixed optical signal, and a plurality of wavelength selecting means arranged at a constant pitch along a fourth end of the second optical link conversion board opposite to the third end for receiving the mixed optical signal from the second optical star coupler, where each of the wavelength selecting means output an optical signal having a single wavelength. Each of the multi-wavelength selective filters of a first optical link conversion board are coupled to an optical receiving part of a corresponding one of the second optical link conversion boards. According to the photonic switching system of the present invention, it is possible to realize cross connection, drop and insert of optical signals at a high speed with ease. In addition, it is possible to realize a blocking-free routing of optical signals using only two stages of board groups.

Other objects and further features of the present invention will be apparent from the following detailed description when read in conjunction with the accompanying drawings.

DESCRIPTION OF THE PREFERRED EMBODIMENTS

First, a description will be given of a conceivable photonic switching system so as to facilitate the understanding of the present invention.

Figure 1:
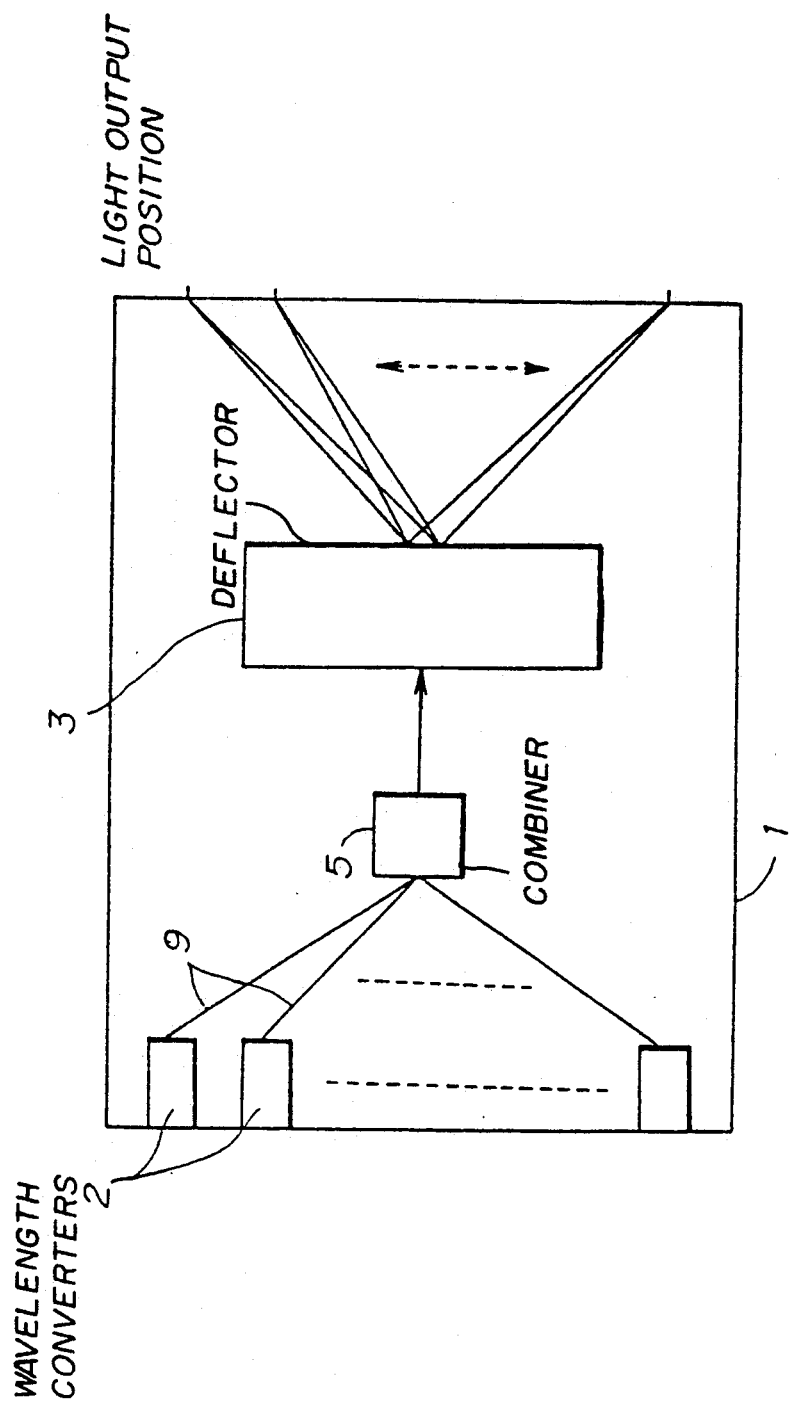
FIG. 1 is a system block diagram generally showing an optical link conversion board of a conceivable photonic switching system.

FIG. 1 shows an optical link conversion board 1 of the conceivable photonic switching system. The optical link conversion board 1 is made of a light guide material and has a generally flat shape.

A plurality of wavelength converter elements 2 which can convert the wavelength of input light (hereinafter referred to as an optical signal) into arbitrary wavelength are provided on the left end of the optical link conversion board 1 in FIG. 1 at a constant pitch. Each wavelength converter element 2 has a light input end facing left and a light output end facing right in FIG. 1. For example, 16 or 17 wavelength converter elements 2 are provided. For example, a wavelength converting laser diode which can freely convert the wavelength of the input optical signal by controlling an applying current may be used for the wavelength converter element 2.

A combiner 5 combines output optical signals of all the wavelength converter elements 2 and outputs an optical signal to a deflector 3. For example, a photocoupler is used as the combiner 5. The combiner 5 is provided at a central part of the optical link conversion board 1, and output ends of the wavelength converter elements 2 and the combiner 5 are optically coupled via guide means 9 such as optical waveguides and optical fibers.

In principle, the deflector 3 may use refraction of a prism. The deflector 3 deflects the optical signal from the combiner 5 in different directions depending on the wavelength, and optical signals are output from the right end of the optical link conversion board 1 at a constant interval.

Accordingly, the optical signals input to the wavelength converter elements 2 at the left end of the light link conversion board 1 are output from different positions at the right end of the optical link conversion board 1 depending on the wavelength converted in each wavelength converter element 2.

In other words, by controlling the wavelength at each wavelength converter element 2, each optical signal is output from an arbitrary position at the right end of the optical link conversion board 1.

Figure 2:
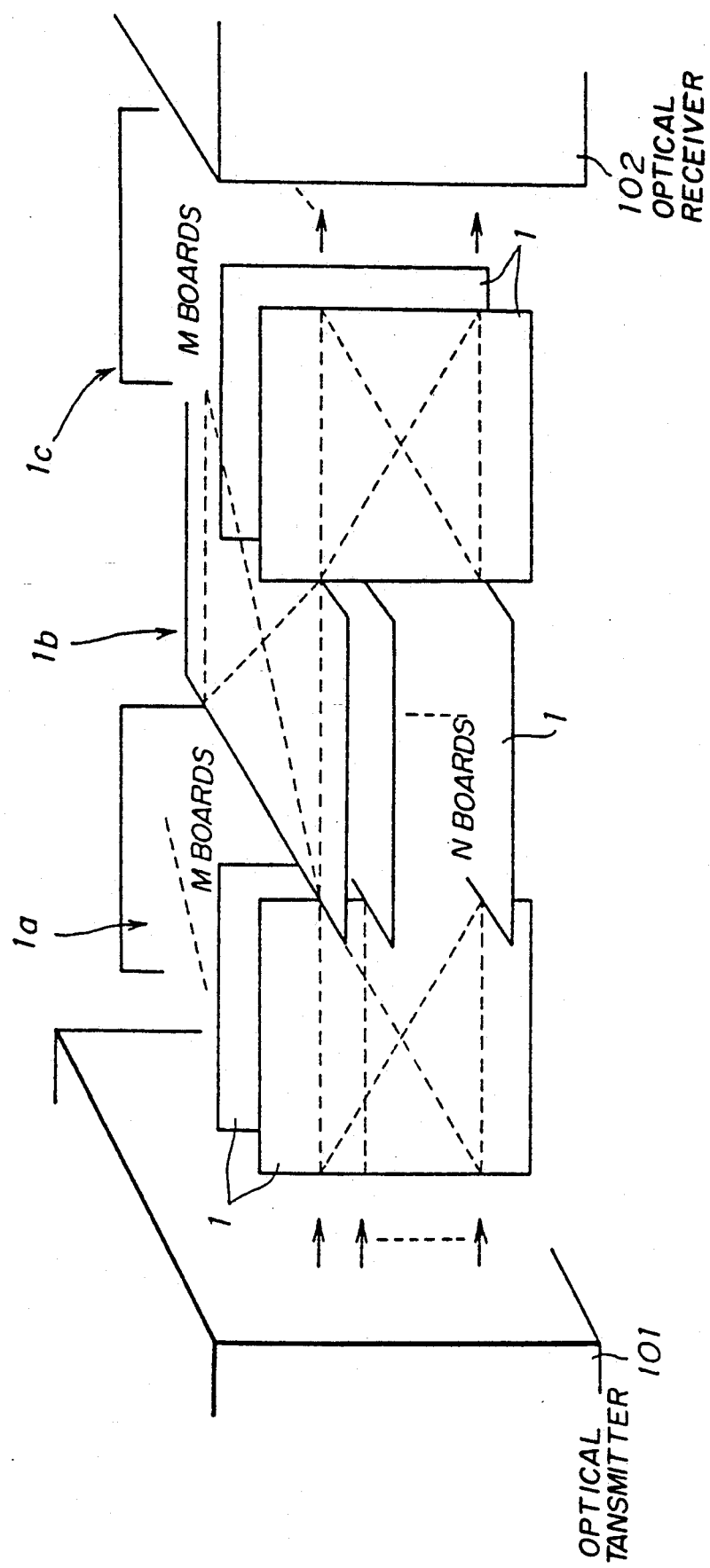
FIG. 2 is a perspective view showing the conceivable photonic switching system.

As shown in FIG. 2, a plurality of the above described optical link conversion boards 1 are arranged in parallel to form an optical link conversion board group. For example, a first optical link conversion board group 1a is made up of 16 optical link conversion boards 1 which are arranged vertically and are mutually parallel. For example, a second optical link conversion board group 1b is made up of 17 optical link conversion boards 1 which are arranged horizontally and are mutually parallel. For example, a third optical link conversion board group 1c is made up of 16 optical link conversion boards 1 which are arranged vertically and are mutually parallel.

Each light input end (wavelength converter element 2) of the first optical link conversion board group 1a is arranged to match a corresponding one of light output positions of 16 (horizontal)×17 (vertical)=272 channels of an optical transmitter part 101. In addition, the first and second optical link conversion board groups 1a and 1b are coupled in series and perpendicular to each other so that each light output position of the first optical link conversion board group 1a matches a corresponding one of light input ends (wavelength converter elements 2) of the second optical link conversion board group 1b.

Similarly, the second and third optical link conversion board groups 1b and 1c are coupled in series and perpendicular to each other so that each light output position of the second optical link conversion board group 1b matches a corresponding one of light input ends (wavelength converter elements 2) of the third optical link conversion board group 1c. In this case, each optical link conversion board 1 of the first and third optical link conversion board groups 1a and 1c has 17 wavelength converter elements 2, and each optical link conversion board 1 of the second optical link conversion board group 1b has 16 wavelength converter elements 2.

According to this conceivable photonic switching system, the wavelength of the output optical signal may be adjusted individually in each of the first through third optical link conversion board groups 1a through 1c so as to guide the optical signal output from each optical communication channel of the optical transmitter part 101 to an arbitrary optical communication channel of an optical receiver part 102.

Of course, it is possible to arrange the first and third optical link conversion board groups 1a and 1c horizontally and the second optical link conversion board group 1b vertically with respect to the optical transmitter part 101 and the optical receiver part 102.

If blocking is permitted, it is possible to omit the third optical link conversion board group 1c and form the photonic switching system using only two stages of optical link conversion board groups (that is, the first and second optical link conversion board groups 1a and 1b). However, when three stages of optical link conversion board groups are provided as shown in FIG. 2, it becomes possible to carry out a blocking free routing of optical signals.

Figure 3:
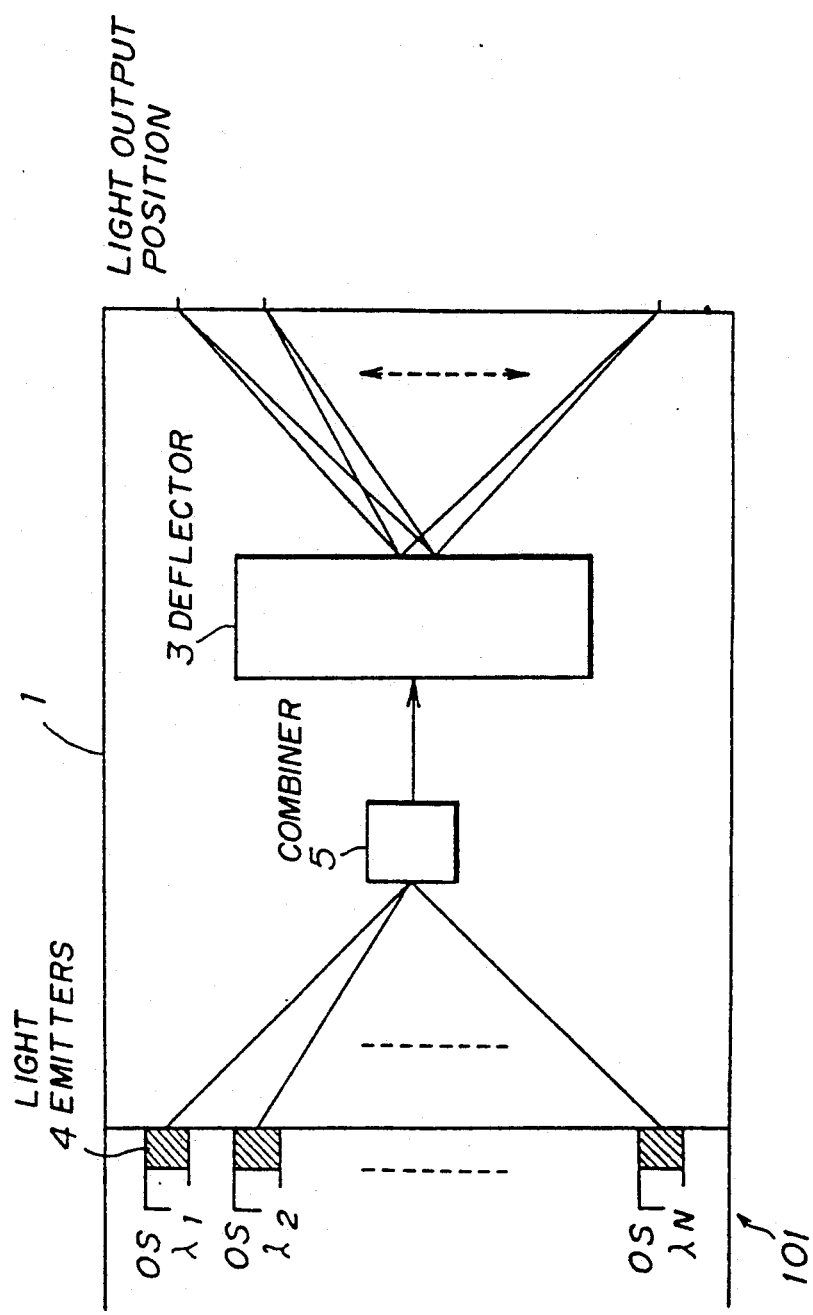
FIG. 3 is a system block diagram generally showing an optical link conversion board of another conceivable photonic switching system.

FIG. 3 shows an optical link conversion board of another conceivable photonic switching system. In FIG. 3, those parts which are the same as those corresponding parts in FIGS. 1 and 2 are designated by the same reference numerals, and a description thereof will be omitted.

In the optical link conversion board 1a shown in FIG. 3, a variable wavelength light emitting element 4 which can emit an optical signal having an arbitrary wavelength is provided in place of the wavelength converter element 2. In addition, the optical link conversion board 1 of the first optical link conversion board group 1a and the optical transmitter part 101 may be provided integrally. For example, a wavelength tunable laser diode which generates laser beams of different wavelengths by varying the applying current may be used for the variable wavelength light emitting element 4.

Figure 4:
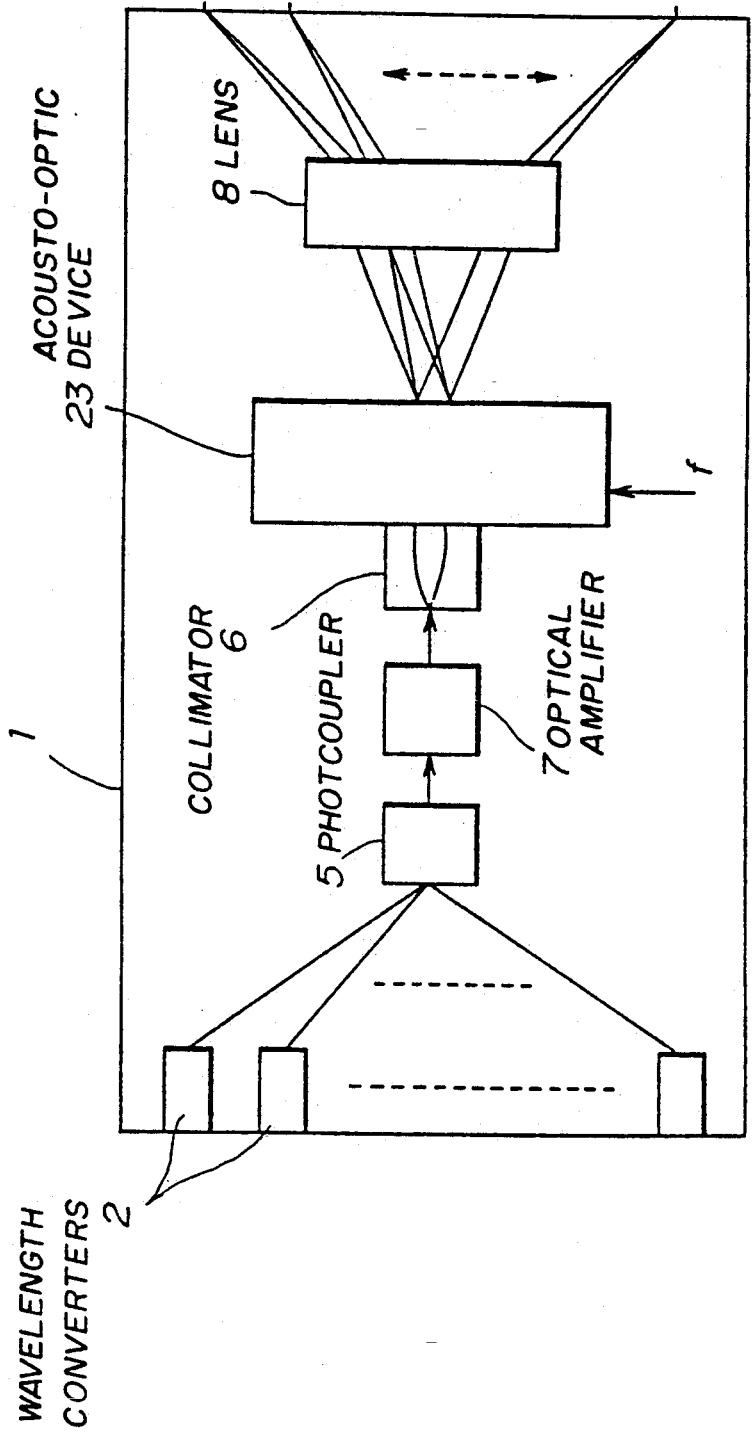
FIG. 4 is a system block diagram showing an optical link conversion board of a first embodiment of a photonic switching system according to the present invention.

Next, a description will be given of a first embodiment of a photonic switching system according to the present invention, by referring to FIG. 4. In FIG. 4, those parts which are the same as those corresponding parts in FIGS. 1 and 3 are designated by the same reference numerals, and a description thereof will be omitted.

The optical link conversion board 1 shown in FIG. 4 may be used as each of the first through third optical link conversion groups 1a through 1c shown in FIG. 3. In FIG. 4, a photocoupler 5 is used as the combiner and an acousto-optic device 23 is used as the deflector. A collimator 6 forms the output light of the photocoupler 5 into parallel light beams, and an optical amplifier 7 compensates for the optical loss at the acousto-optic device 23. A lens 8 converges the light beam at the light output position.

A signal having an RF frequency f is applied to the acousto-optic device 23. An angle $\theta$ of diffraction of the acousto-optic device 23 can be described by $\theta = f\lambda/v$, where $\lambda$ denotes the wavelength and v denotes the speed of sound within an acousto-optic medium.

Accordingly, in order to change $\theta$, the RF frequency for the speed v is changed. When an optical signal including optical signal components having various wavelengths is input to the acousto-optic device 23, the input optical signal (light) takes an angle of diffraction dependent on the wavelength and is deflected in different directions without the need to change the RF frequency f. Hence, by appropriately selecting the RF frequency f, the optical signal components having different wavelengths can be output sequentially from the right end of the optical link conversion board 1 at constant intervals depending on the wavelength.

Figure 5:
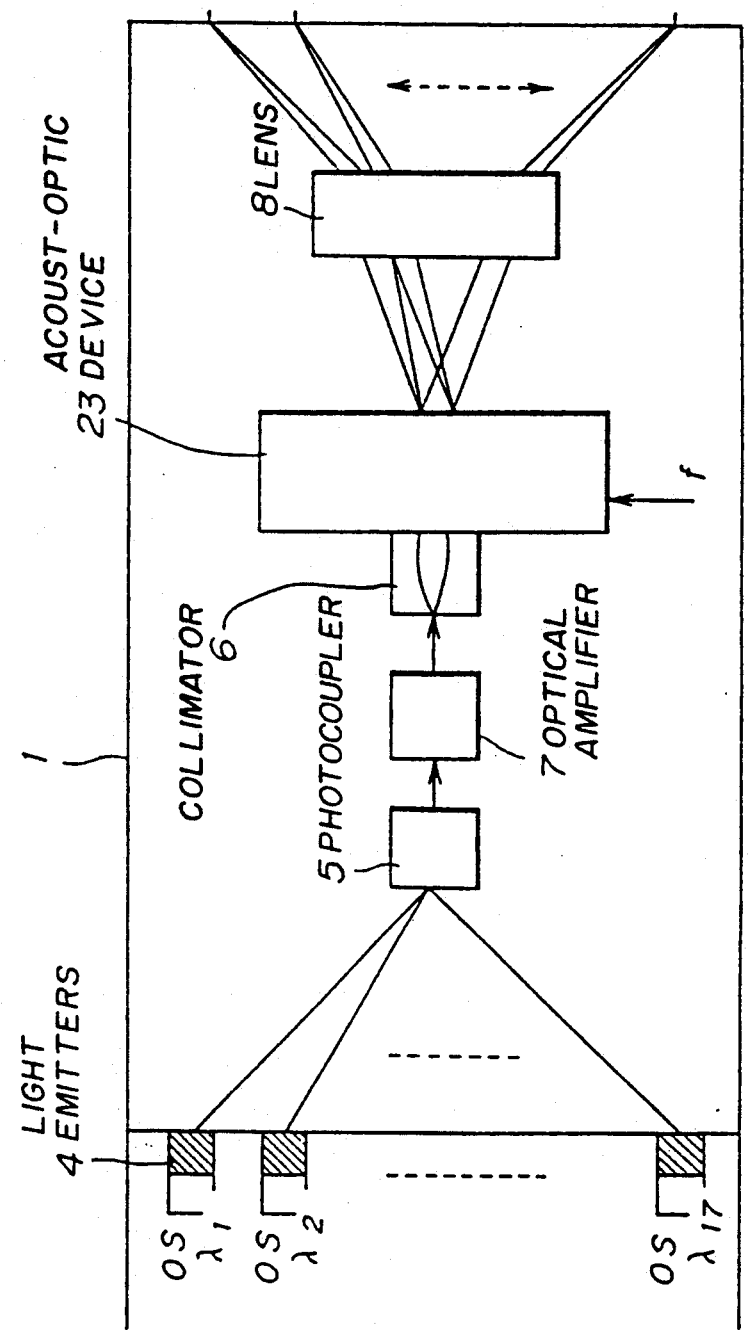
FIG. 5 is a system block diagram showing an optical link conversion board of a second embodiment of the photonic switching system according to the present invention.

FIG. 5 shows an optical link conversion board of a second embodiment of the photonic switching system according to the present invention. In FIG. 5, those parts which are the same as those corresponding parts in FIGS. 3 and 4 are designated by the same reference numerals, and a description thereof will be omitted.

In this embodiment, the variable wavelength light emitting element 4 is provided in place of the wavelength converter element 2 of the optical link conversion board 1 of the first optical link conversion board group 1a.

In addition, it is possible to deflect the optical signal to a predetermined light output position by inputting the input optical signal to different acousto-optic devices 23 and applying signals having different RF frequencies f to the acousto-optic devices 23.

Furthermore, it is possible to use a diffraction grating or a hologram as the beam deflector. A wavelength divider may be used in place of the acousto-optic device 23 and the optical signal may be guided thereafter to the predetermined light output position using an optical fiber or the like.

Moreover, a light refractive index crystal may be used in place of the acousto-optic device 23. In this case, a diffraction grating is formed by irradiating on the crystal light beams from both sides with an angle of 45° in both the upward and downward directions.

However, in the first and second embodiments described above, it is impossible to freely guide the optical signals from all input position to any output when only two stages of the optical link conversion board groups are used, and the so-called blocking occurs. For this reason, it is necessary to connect three stages of the optical link conversion board groups in order to carry out the blocking-free routing of the optical signals.

Figure 6:
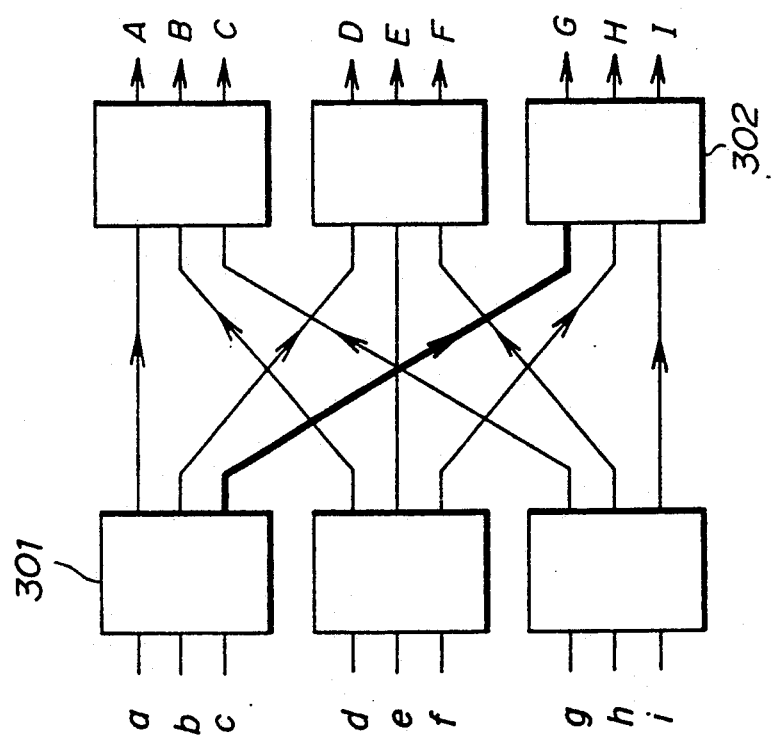
FIGS. 6 and 7 are system block diagrams for explaining the blocking which occurs depending on the number of stages of optical link conversion board groups.

FIG. 6 shows a case where only two stages of optical link conversion board groups are connected, where there are $3 \times 3 = 9$ input ports and output ports. When the input signals at the input ports a and b respectively are to be output from the output ports G and H, it is only possible to output the signal at the input port a to the output port G or the signal at the input port b to the output port G because there is only one route which connects optical link conversion boards 301 and 302 as indicated by a thick solid line in FIG. 6. In other words, the blocking occurs.

Figure 7:
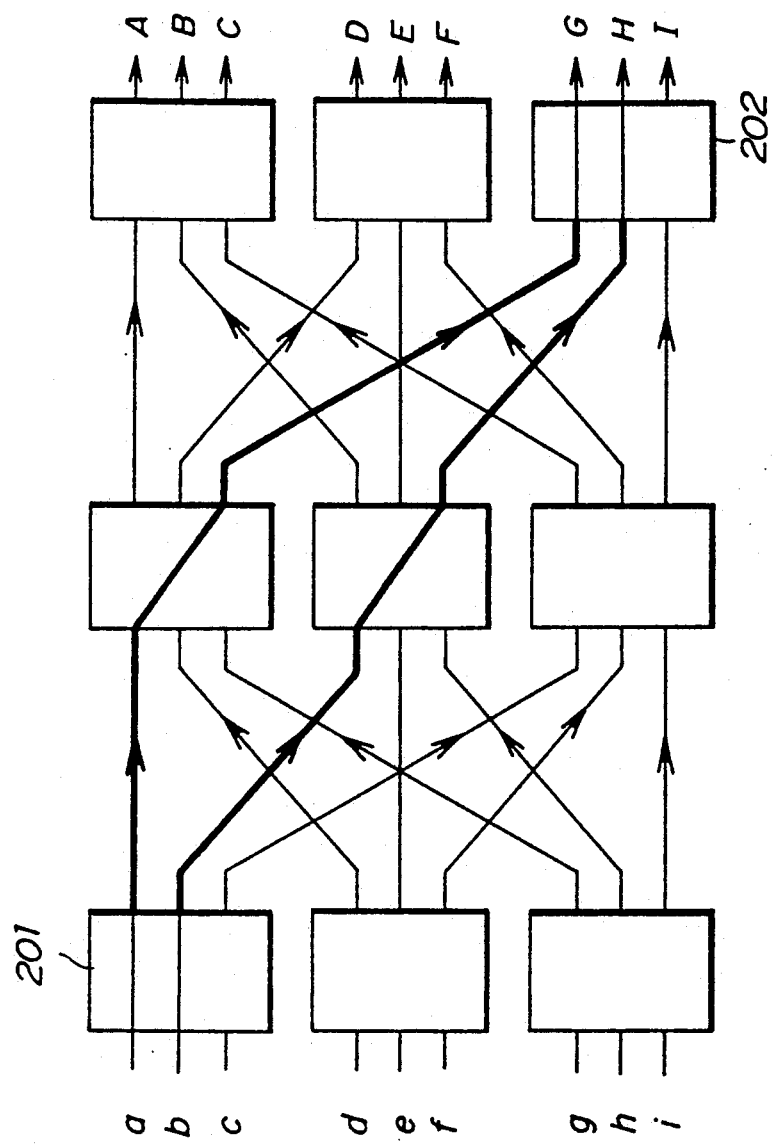

On the other hand, FIG. 7 shows a case where three stages of optical link conversion board groups are connected, where there are $3 \times 3 = 9$ input ports and output ports. When the input signals at the input ports a and b respectively are to be output from the output ports G and H, it is possible to output the signal at the input port a to the output port G and to output the signal at the input port b to the output port G because there are more than one route connecting optical link conversion boards 201 and 202 as indicated by a thick solid line in FIG. 7. In FIG. 7, there are three routes connecting the optical link conversion boards 201 and 202, and no blocking occurs.

Next, a description will be given of embodiments in which the blocking can be prevented even when only two stages of optical link conversion board groups are connected.

Figure 8:
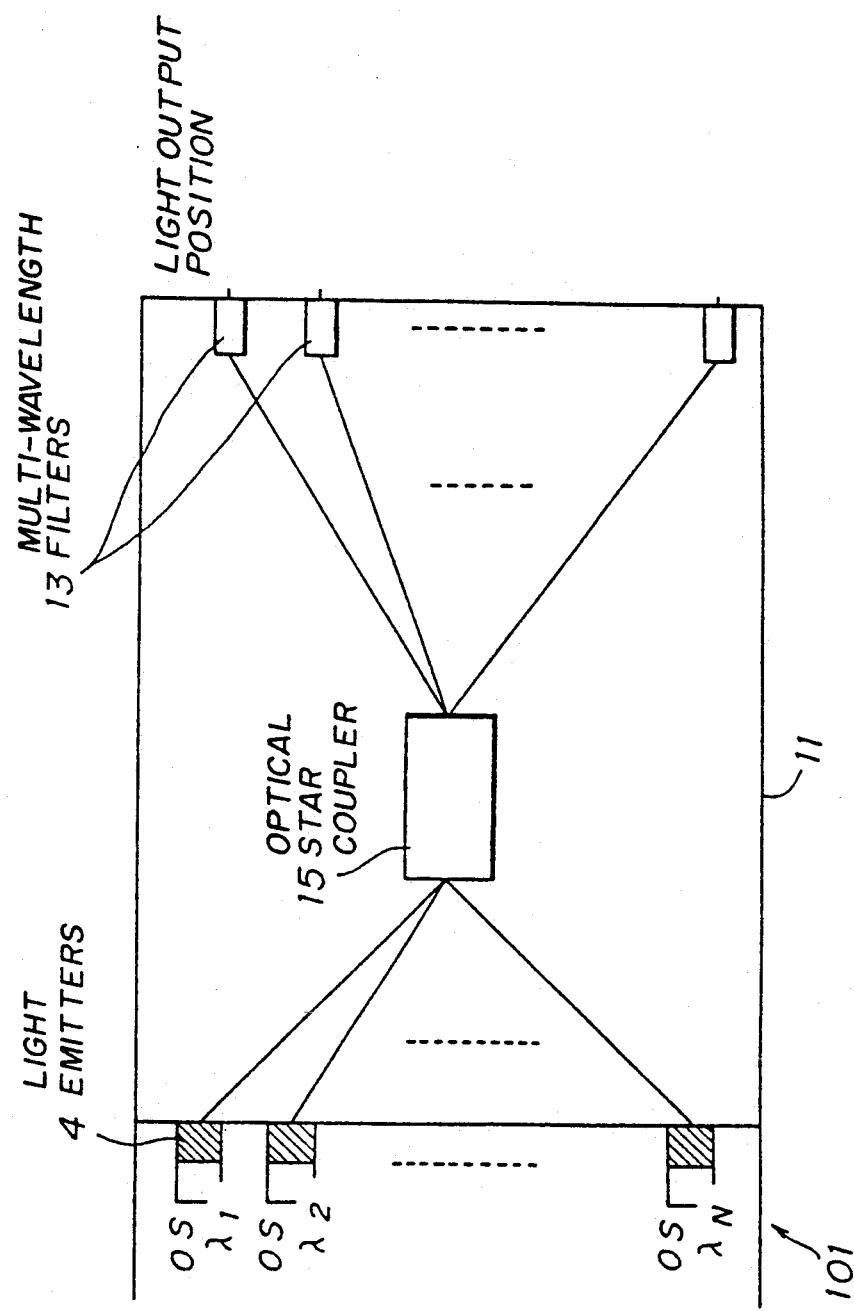
FIGS. 8 and 9 are system block diagrams respectively showing optical link conversion boards of first and second optical link conversion board groups used in a third embodiment of the photonic switching system according to the present invention.
Figure 9:
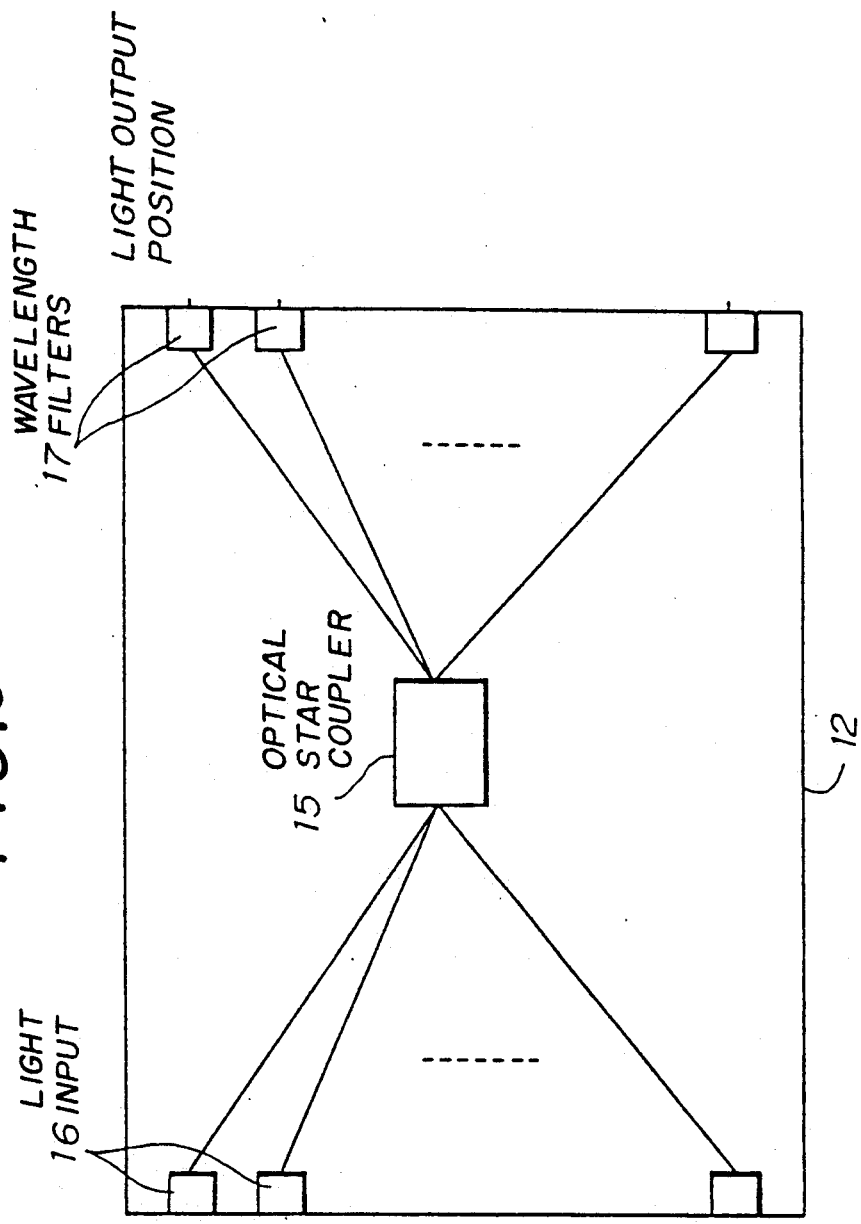

FIGS. 8 and 9 are system block diagrams respectively showing optical link conversion boards of in first and second optical link conversion board groups which are used in a third embodiment of the photonic switching system according to the present invention. In FIGS. 8 and 9, those parts which are the same as those corresponding parts in FIGS. 4 and 5 are designated by the same reference numerals, and a description thereof will be omitted.

In FIG. 8, an optical link conversion board 11 which forms a first optical link conversion board group 11a has the variable wavelength light emitting elements 4 provided at the input (left) end thereof for generating optical signals having arbitrary wavelengths. An optical star coupler 15 is provided at the central part of the optical link conversion board 11 for mixing the optical signals output from all of the variable wavelength light emitting elements 4. The mixed optical signal is guided to the light output positions at the output (right) end. A multi-wavelength selective filter 13 is provided at each light output position. The multi-wavelength selective filter 13 selects an arbitrary wavelength out of the mixed optical signal. Hence, from each light output position, it is possible to output an arbitrary number of optical signal components having arbitrary wavelengths or to output no optical signal. The optical link conversion board 11 of the first optical link conversion board group 11a and the optical transmitter part 101 may or may not be provided integrally.

In FIG. 9, an optical link conversion board 12 which forms a second optical link conversion board group 12a has light input parts 16 provided at the input (left) end thereof solely for receiving input-optical signal. The light input parts 16 are arranged at a constant pitch. Wavelength filters 17 are provided at the output (right) end of the optical link conversion board 12 The wavelength filters 17 are arranged at a constant pitch. Each wavelength filter 17 selectively outputs an optical signal component having an arbitrary wavelength out of the optical signal received from the optical star coupler 15.

Figure 10:
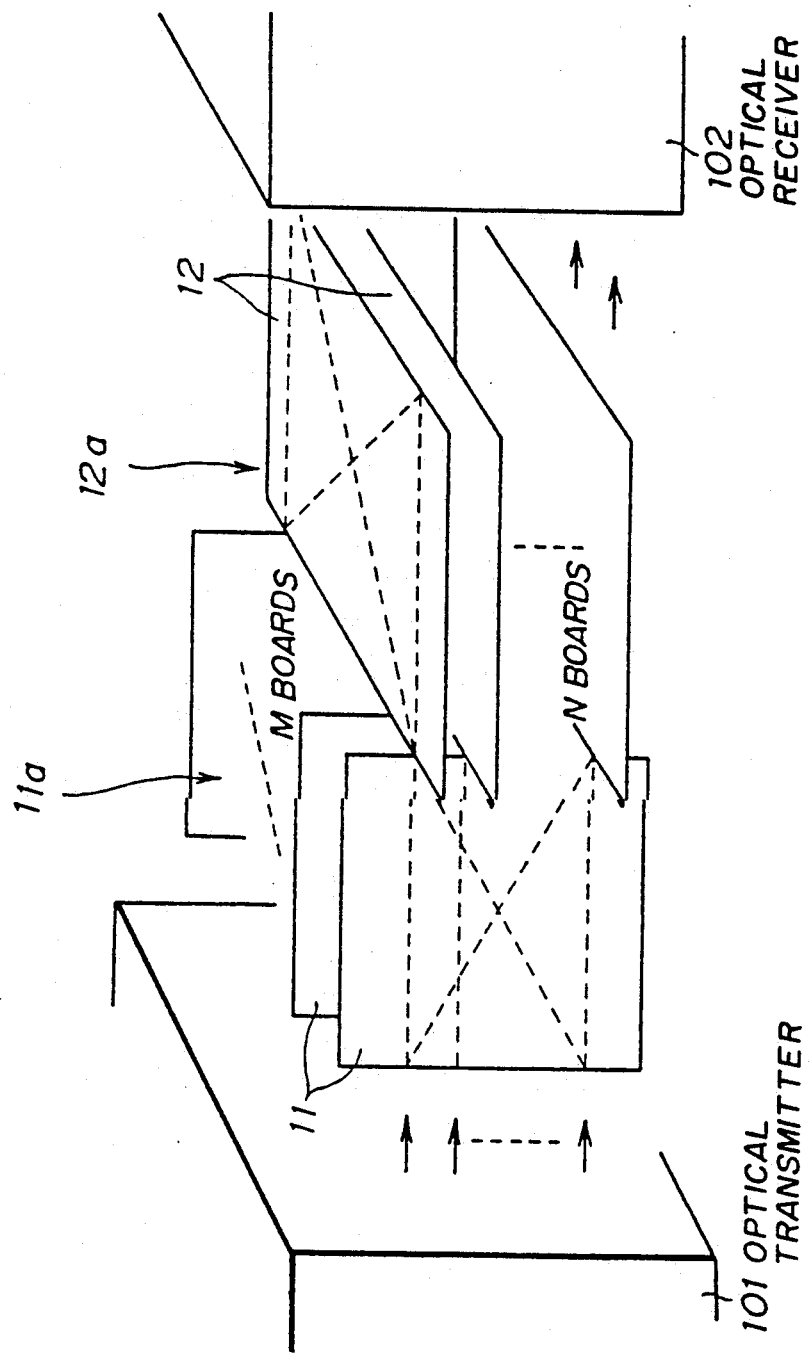
FIG. 10 is a perspective view generally showing the third embodiment of the photonic switching system according to the present invention.

Because the optical link conversion board 11 of the first optical link conversion board group 11a has the structure shown in FIG. 8 and the optical link conversion board 12 of the second optical link conversion board group 12a has the structure shown in FIG. 9, the plurality of optical signal components output from one light output position of the optical link conversion board 11 can be separated and output from different light output positions of the optical link conversion board 12. Hence, when the first and second optical link conversion board groups 11a and 12a are connected as shown in FIG. 10, it is possible to carry out the routing of the optical signals from the optical transmitter part 101 to the optical receiver part 102 without introducing the blocking, although only two stages of optical link conversion board groups are provided.

Figure 11:
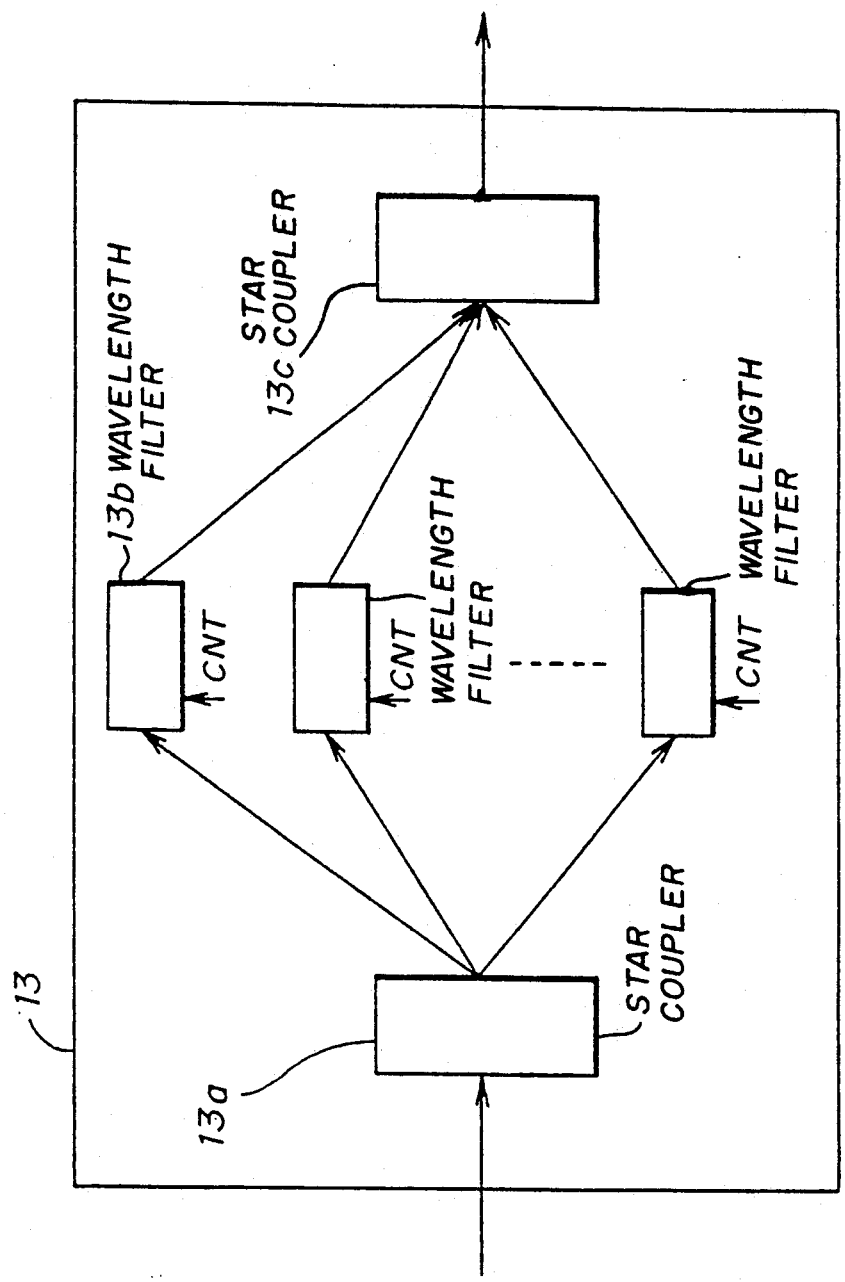
FIG. 11 is a system block diagram showing an embodiment of a multi-wavelength selective filter.

FIG. 11 shows an embodiment of the multi-wavelength selective filter 13. The multi-wavelength selective-filter 13 includes optical star couplers 13a and 13c and wavelength filters 13b. The optical star coupler 13a drops the input optical signal into a plurality of optical signal components. The dropped optical signal components from the optical star coupler 13a are passed through the wavelength filters 13b. Each wavelength filter 13b can selectively output optical signal component having an arbitrary wavelength dependent on a control signal CNT applied thereto. The optical signal components from the wavelength filters 13b are mixed and output from the optical star coupler 13c.

For example, the number of wavelength filters 13b is equal to the number of wavelengths of the optical signal components included in the input optical signal. Hence, it is possible to pass an arbitrary number of optical signal components having arbitrary wavelengths by independently controlling the wavelength filters 13b so that optical signal components having different wavelengths are permitted to pass or not permitted to pass at all.

Figure 12:
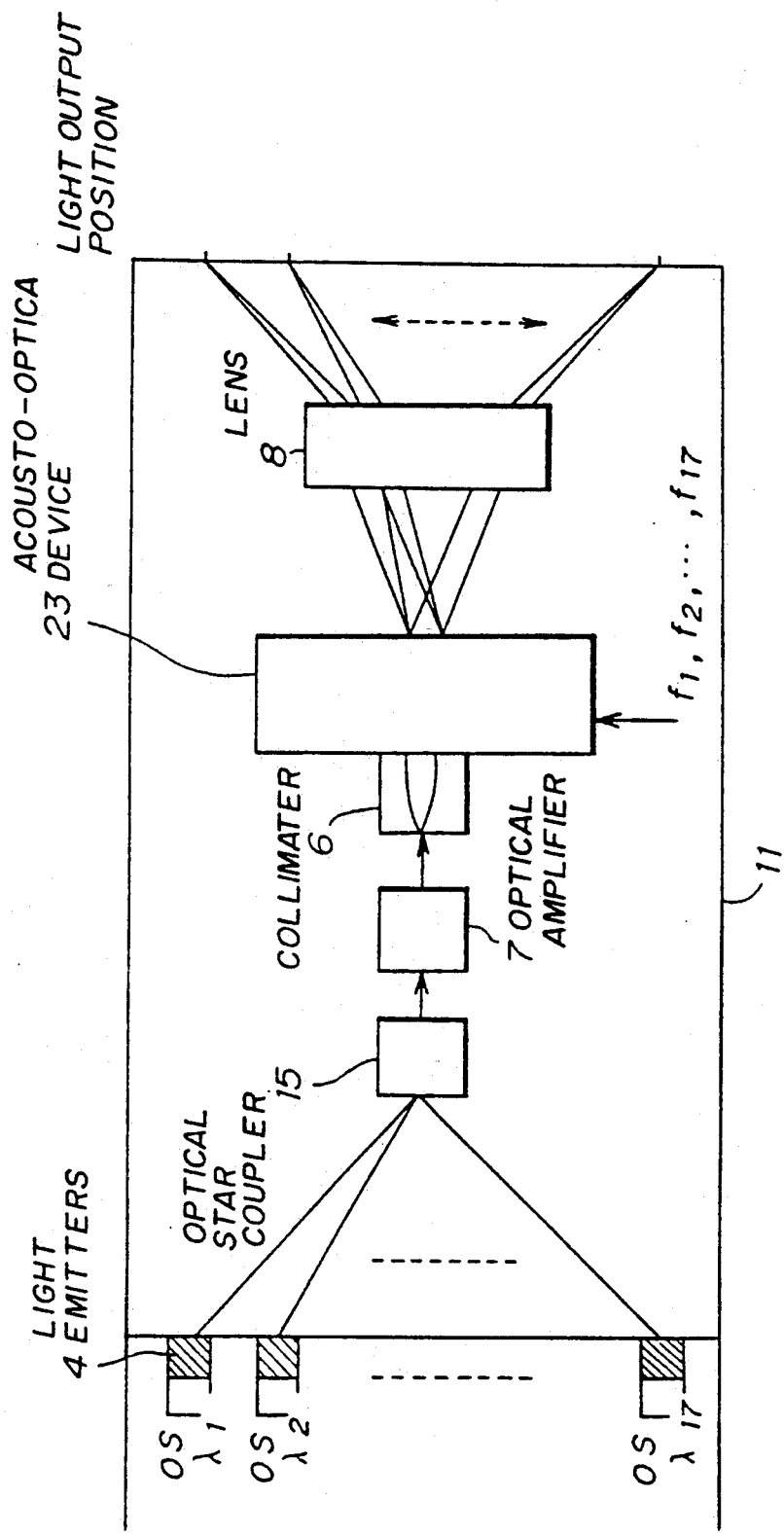
FIG. 12 is a system block diagram generally showing an optical link conversion board of a first optical link conversion board group used in a fourth embodiment of the photonic switching system according to the present invention.

FIG. 12 shows the optical link conversion board 11 of the first optical link conversion board group 11a which is used in a fourth embodiment of the photonic switching system according to the present invention. In FIG. 12, those parts which are the same as those corresponding parts in FIGS. 4 and 8 are designated by the same reference numerals, and a description thereof will be omitted.

In this embodiment, an acousto-optic device 23 is used in place of the multi-wavelength selective filter 13. In addition, the acousto-optic device 23 is driven by a modulation frequency f in which frequencies f1, f2, ..., f17 may be multiplexed. The optical star coupler 15, the collimator 6, the optical amplifier 7 and the lens 8 are the same as those described in conjunction with FIG. 4.

According to this embodiment, the second optical link conversion board group 12a may be made up of the optical link conversion board 12 shown in FIG. 9. By using the second optical link conversion board group 12a and the first optical link conversion board group 11a which is made up of the optical link conversion board 11 shown in FIG. 12, it is also possible to carry out a blocking-free routing of optical signals using only two stages of optical link conversion board groups.

Figure 13:
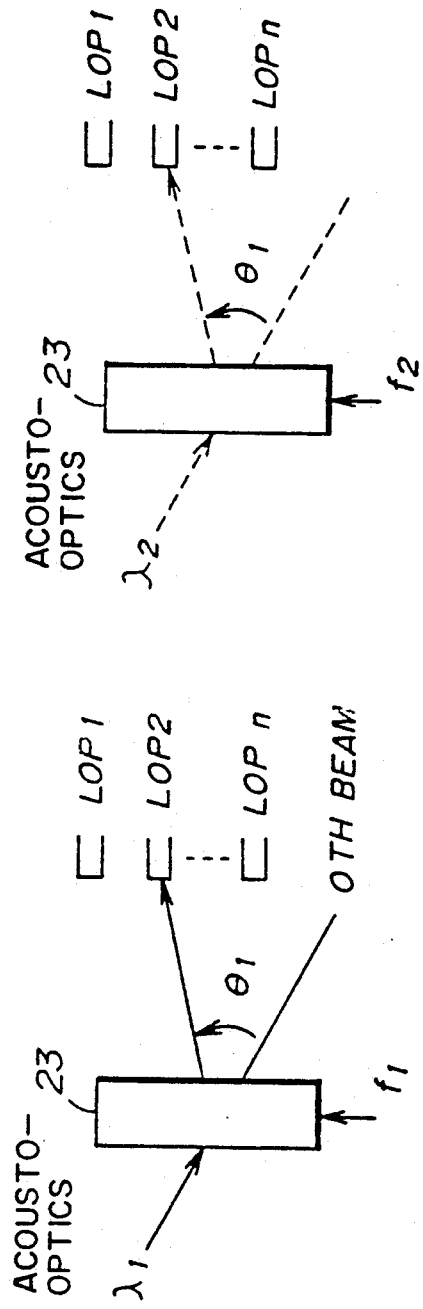
FIGS. 13A through 13C are diagrams for explaining the fourth embodiment of the photonic switching system.

In this embodiment, the acousto-optic device 23 deflects one or a plurality of optical signal components having a plurality of wavelengths to a desired light output position of the optical link conversion board 1. FIG. 13A shows a case where the RF frequency $f=f_1$ is applied to the acousto-optic device 23 to deflect the optical signal component having the wavelength $\lambda_1$ to a light output position LOP2. Similarly, FIG. 13B shows a case where the RF frequency $f=f_2$ is applied to the acousto-optic device 23 to deflect the optical signal component having the wavelength $\lambda_2$ to the light output position LOP2. FIG. 13C shows a case where the RF frequency $f=f_1+f_2$ is applied to the acousto-optic device 23 to deflect the optical signal components having the wavelengths $\lambda_1$ and $\lambda_2$ to the light output position LOP2.

Hence, according to this embodiment, it is possible to output to one light output position of the optical link conversion board 1 an optical signal which includes a plurality of optical signal components having different wavelengths. This is the reason why it becomes possible to carry out a blocking-free routing of optical signals by use of only two stages of optical link conversion boards.

Of course, the embodiment shown in FIG. 4 may be modified similarly like the fourth embodiment of the photonic switching system.

In the embodiments described above, the optical link conversion boards need not be connected directly, and optical fibers or optical fiber bundles may be used to connect the optical link conversion boards. In addition, when a semiconductor laser diode amplifier or an Er doped fiber having optical amplifying function is inserted in the optical fibers or optical fiber bundles, it is possible to compensate for the optical loss introduced at each optical link conversion board and prevent characteristic deterioration of the light receiving circuit on the reception side.

Furthermore, in the described embodiments, the so-called cross connection is taken as an example of the optical switching. However, when a part of the input or output channel is dropped, it is of course possible to easily carry out the so-called insert or drop.

Next, a description will be given of another embodiment of the multi-wavelength selective filter. According to this embodiment of the multi-wavelength selective filter, it is possible to extract an arbitrary number of optical signal components having arbitrary wavelengths out of an optical signal which includes a plurality of optical signal components having different wavelengths.

First, a description will be given of an operating principle of the multi-wavelength selective filter, by referring to FIG. 14. The multi-wavelength selective filter shown in FIG. 14 includes a plurality of specific wavelength eliminating means 501, a plurality of optical link switching means 503 and a control means 504 which are coupled as shown.

The plurality of specific wavelength eliminating means 501 respectively eliminate optical signal components having different wavelengths from passing optical signal. The plurality of optical link switching means 503 can freely switch the optical links so that the optical signal transmitted through an optical link 502 is transmitted as it is through the optical link 502 or is returned to the optical path after passing through the specific wavelength eliminating means 501. The control means 504 controls the operation of each optical link switching means 503. Hence, it is possible to pass only the optical signal components having wavelengths other than the wavelength eliminated by the specific wavelength eliminating means 501. As a result, it is possible to pass an arbitrary number of optical signal components having arbitrary wavelengths from a case where all the optical signal components having the different wavelengths are passed to a case where all the optical signal components having the different wavelengths are not passed at all.

Figure 14:
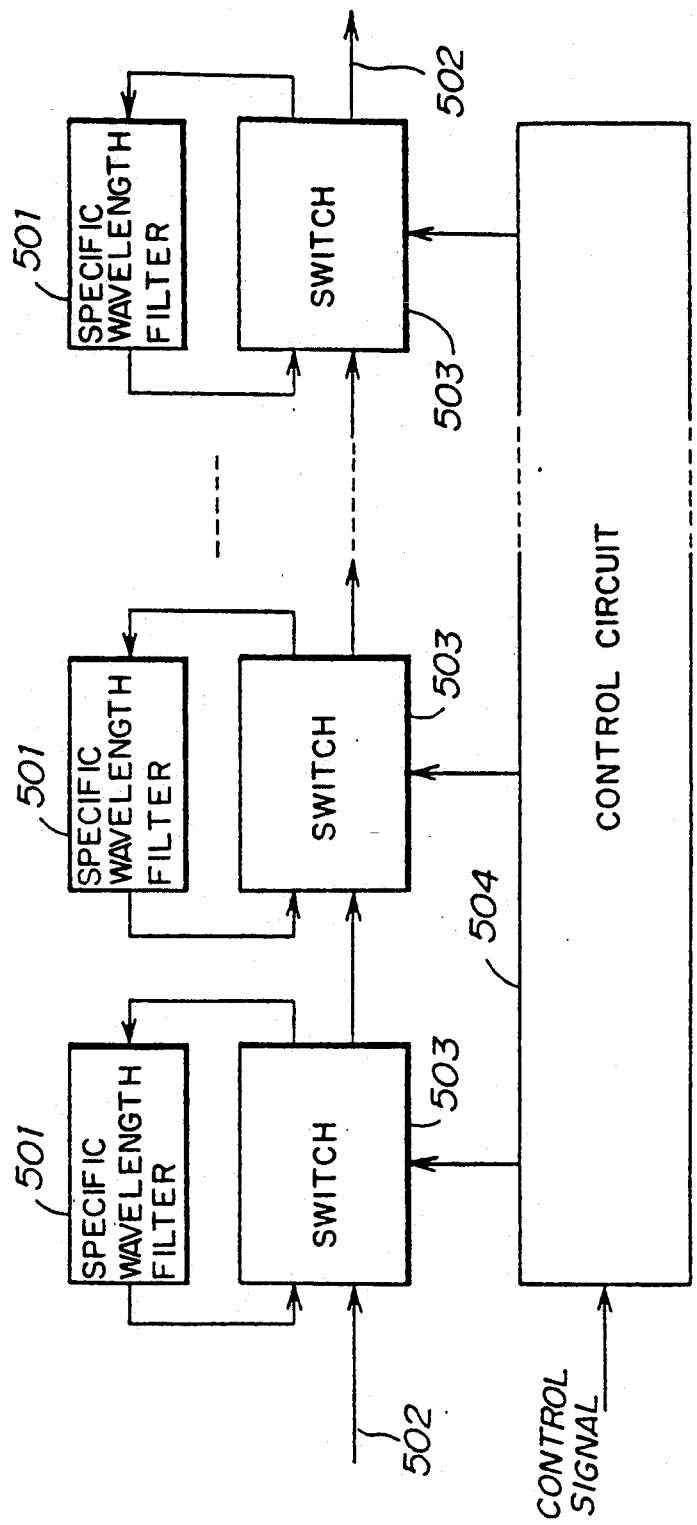
FIG. 14 is a system block diagram for explaining another embodiment of a multi-wavelength selective filter.
Figure 15:
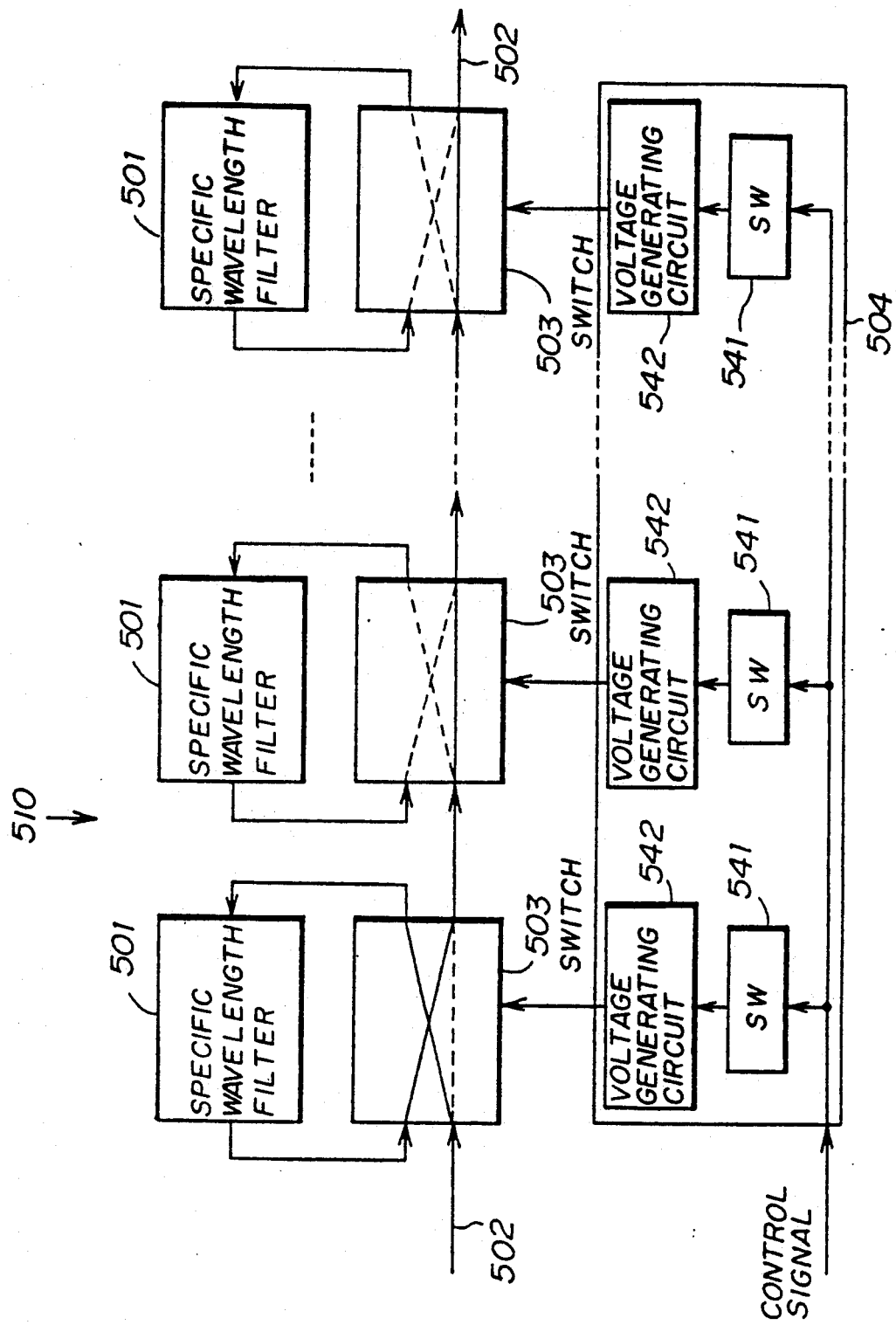
FIG. 15 is a system block diagram showing the multi-wavelength selective filter shown in FIG. 14 in more detail.

FIG. 15 shows the embodiment of the multi-wavelength selective filter shown in FIG. 14 in more detail. In FIG. 15, those parts which are the same as those corresponding parts in FIG. 14 are designated by the same reference numerals, and a description thereof will be omitted.

In a multi-wavelength selective filter 510 shown in FIG. 15, a fiber notch filter is used as the specific wavelength eliminating means 501. An optical fiber is used as the optical link 502, and an optical switch is used as the optical link switching means 503. A control circuit is used as the control means 504. A plurality of optical switches 503 are inserted in series in the optical fiber 502 for arbitrarily switching the optical link. For example, the number of optical switches 503 is equal to the number of optical signal components having the different wavelengths included in the optical signal which is transmitted in the optical fiber 503. In other words, when the optical signal includes 10 kinds of optical signal components having the different wavelengths, then 10 optical switches 503 are inserted.

The fiber notch filter 501 eliminates an optical signal component having a specific wavelength from the passing optical signal. The number of fiber notch filters 501 provided corresponds to the number of optical switches 503 which are provided. The fiber notch filters 501 respectively eliminate optical signal components having mutually different wavelengths from the passing optical signal.

Figure 16:
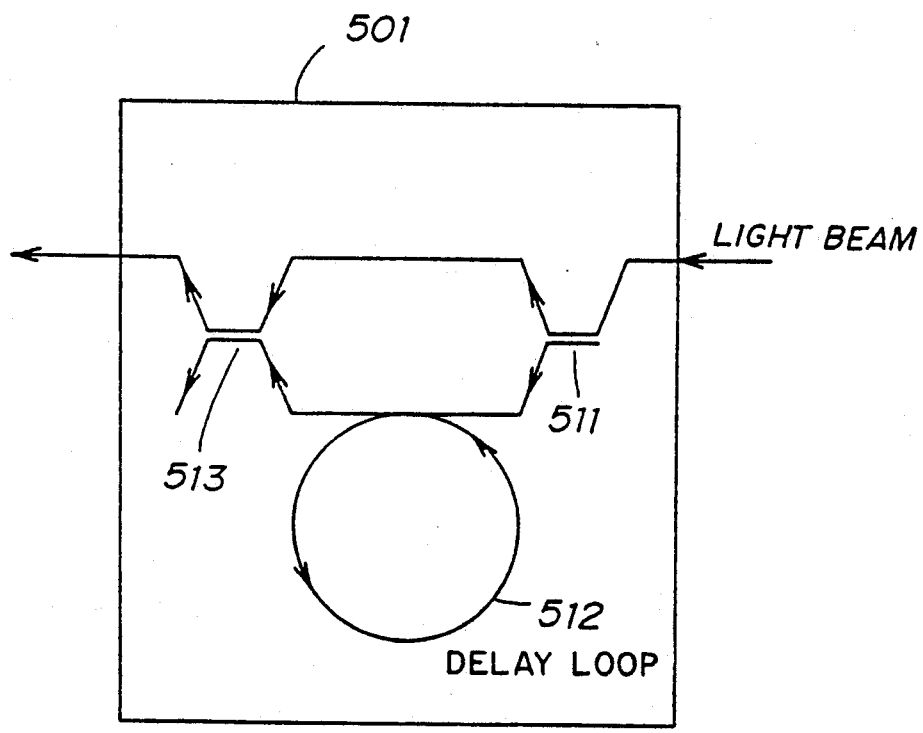
FIG. 16 shows an embodiment of a fiber notch filter shown in FIG. 15.

FIG. 16 shows an embodiment of the fiber notch filter 501 which includes first and second coupler parts 511 and 513, and a delay loop 512 which is made of an optical fiber. The input optical signal is equally dropped into two optical signal components. One optical into two optical signal components. One optical signal component from the first coupler part 511 is supplied directly to the second coupler part 513, while the other optical signal component from the first coupler part 511 is supplied to the second coupler part 513 after passing through the delay loop 512. The optical signal components from the first coupler part 511 and the delay loop 512 are mixed into one optical signal and then equally dropped into two optical signal components by the second coupler part 513. Only one of the two optical signal components from the second coupler part 513 is output from the fiber notch filter 501.

Accordingly, the optical signal components which are mixed at the second coupler part 513 after passing two different routes have a phase difference because one of the optical signal components is passed through the delay loop 512. As a result, the optical signal component having a specific wavelength is attenuated and eliminated by the interference and only the optical signal component having the remaining wavelengths is output. The fiber notch filters 501 shown in FIG. 15 can respectively eliminate optical signal components having mutually different wavelengths because the lengths of the delay loops 512 are different for each fiber notch filter 501.

Returning now to the description of FIG. 15, the optical switches 503 are provided so that it is possible to individually select whether the optical signal transmitted through the optical fiber 502 is to be transmitted as it is through the optical fiber 502 or is to be returned to the optical fiber 502 after passing through the fiber notch filter 501. For example, the optical switch 503 on the right side in FIG. 15 passes the optical signal as it is through the optical fiber 502, while the optical switch 503 on the left side in FIG. 15 returns the optical signal to the optical fiber 502 after passing the optical signal through the fiber notch filter 501.

The switching of the optical switches 503 can be made by varying applying voltages to the optical switches 503. The control circuit 504 controls this switching of the optical switches 503. The control circuit 504 includes switches 541 and voltage generating circuits 542. For example, a control signal from a computer (not shown) is input to the control circuit 504, and the switches 541 which are provided in correspondence with the optical switches 503 are opened or closed in response to the control signal, thereby controlling the corresponding voltage generating circuits 542 to an ON or OFF state. The applied currents to the optical switches 503 are independently controlled so as to independently control the optical link switching operation of the optical switches 503, and thus, the optical signal is passed through one or a plurality of arbitrary fiber notch filters 501.

Therefore, when the optical signal does not pass through any fiber notch filter 501, all of the wavelengths of the optical signal are transmitted through the optical fiber 502. On the other hand, when the optical signal passes through all of the fiber notch filters 501, all of the wavelengths of the optical signal are eliminated and no optical signal is output from the multi-wavelength selective filter 510. Further, when the optical signal passes through one or a plurality of fiber notch filters 501, only the optical signal components having the wavelengths other than one or plurality of wavelengths eliminated by the one or plurality of fiber notch filters 501 are transmitted through the optical fiber 502 and output from the multi-wavelength selective filter 510.

Of course, the multi-wavelength selective filter 510 can be used in place of the multi-wavelength selective filter 13 shown in FIG. 8.

Further, the present invention is not limited to these embodiments, but various variations and modifications may be made without departing from the scope of the present invention.

What is claimed is:

1. A photonic switching system comprising:
   an optical link conversion board having a first end and a second end opposite to the first end;
   a plurality of wavelength converter elements arranged at a constant pitch along the first end of said optical link conversion board and converting input optical signals into optical signal components having different wavelengths;
   combiner means for combining the optical signal components received from said wavelength converter elements into an optical signal which includes optical signal components having a plurality of wavelengths;
   a plurality of light output parts arranged at a constant pitch along the second end of said optical link conversion board; and
   deflection means for sequentially deflecting the optical signal from said combiner means to an arbitrary one of said light output parts in response to a control signal so that a plurality of optical signals having different wavelengths are received at the arbitrary light output part.

2. The photonic switching system as claimed in claim 1, wherein said deflection means includes an acousto-optic element which deflects the optical signal from said combiner means in response to the control signal which is dependent on the wavelengths of the optical signals to be output to the arbitrary light output part.

3. The photonic switching system as claimed in claim 2, wherein said deflection means further includes a lens for converging the deflected optical signal from said acousto-optic element at the arbitrary light output part.

4. The photonic switching system as claimed in claim 1, wherein said combiner means includes a combiner which receives the optical signal components from said wavelength converter elements, an optical amplifier for amplifying an output of said combiner, and a collimator for forming an output of said optical amplifier into parallel light beams.

5. A photonic switching system comprising:
   an optical link conversion board having a first end and a second end opposite to the first end;
   a plurality of variable wavelength light emitting elements arranged at a constant pitch along the first end of said optical link conversion board and emitting optical signals having different wavelengths;
   combiner means for combining the optical signals received from said light emitting elements into an optical signal which includes optical signal components having a plurality of wavelengths;
   a plurality of light output parts arranged at a constant pitch along the second end of said optical link conversion board; and
   deflection means for sequentially deflecting the optical signal from said combiner means to an arbitrary one of said light output parts in response to a control signal so that a plurality of optical signals having different wavelengths ar received at the arbitrary light output part.

6. The photonic switching system as claimed in claim 5, wherein said deflection means includes an acousto-optic element which deflects the optical signal from said combiner means in response to the control signal which is dependent on the wavelengths of the optical signals to be output to the arbitrary light output part.

7. The photonic switching system as claimed in claim 6, wherein said deflection means further includes a lens for converging the deflected optical signal from said acousto-optic element at the arbitrary light output part.

8. The photonic switching system as claimed in claim 5, wherein said combiner means includes a combiner which receives the optical signals from said light emitting elements, an optical amplifier for amplifying an output of said combiner, and a collimator for forming an output of said optical amplifier into parallel light beams.

9. A photoconic switching system comprising:
   an optical link conversion board having a first end and a second end opposite to the first end;
   a plurality of variable wavelength light emitting elements arranged at a constant pitch along the first end of said optical link conversion board and emitting optical signal components having different wavelengths;
   a single optical star coupler means mixing the optical signal components received from said light emitting elements and outputting a mixed optical signal; and
   a plurality of multi-wavelength selective filters arranged at a constant pitch along the second end of said optical link conversion board and receiving and processing only the mixed optical signal from said single optical star coupler means,
   each of said multi-wavelength selective filters selectively outputting an optical signal which includes optical signal components having desired wavelengths out of the wavelengths included ion the optical signal components making up the mixed optical signal.

10. A photoconic switching system comprising:
    an optical link conversion board having a first end and a second end opposite to the first end;
    a plurality of variable wavelength light emitting elements arranged at a constant pitch along the first end of said optical link conversion board and emitting optical signal components having different wavelengths;
    optical star coupler means mixing the optical signal components received from said light emitting elements and outputting a mixed optical signal; and
    a plurality of multi-wavelength selective filters arranged at a constant pitch along the second end of said optical link conversion board and receiving the mixed optical signal from said optical star coupler means,
    each of said multi-wavelength selective filters selectively outputting an optical signal which includes optical signal components having desired wavelengths out of the wavelengths included in the optical signal components making up the mixed optical signal, wherein
    said multi-wavelength selective filter comprises a first optical star coupler which drops the mixed optical signal received from said optical star coupler means and outputs optical signals, a plurality of wavelength selecting elements which receive the optical signals from said first optical star coupler and respectively output an optical signal components form said wavelength selecting elements and outputs the optical signal which includes the optical signal components having the desired wavelengths.

11. The photonic switching system as claimed in claim 9, wherein said multi-wavelength selective filter comprises a plurality of eliminating means respectively for eliminating an optical signal component having a specific wavelength, a plurality of switching means respectively coupled to a corresponding one of said eliminating means for passing an optical signal as it is or through the corresponding eliminating means in response to a control signal, and control means for controlling switching of said switching means by supplying the control signal to each of said switching means, said switching means being coupled in series in n stages and receiving the optical signal from said optical star coupler means at the switching means in a first stage and outputting the optical signal which includes the optical signal components having the desired wavelength components from the switching means in an nth stage.

12. A photonic switching system comprising:
a first board group made up of a plurality of mutually parallel first optical link conversion boards; and
a second board group made up of a plurality of mutually parallel second optical link conversion boards which are arranged perpendicularly to the first optical link conversion boards of said first board group,
each of the first optical link conversion boards comprising:
a plurality of wavelength converter elements arranged at a constant pitch along a first end of the optical link conversion board and converting input optical signals into optical signal components having different wavelengths;
combiner means for combining the optical signal components received from said wavelength converter elements into an optical signal which includes optical signal components having a plurality of wavelengths;
a plurality of light output parts arranged at a constant pitch along a second end of said optical link conversion board opposite to the first end; and
deflection means for sequentially deflecting the optical signal from said combiner means to an arbitrary one of said light output parts in response to a control signal so that the optical signal at the arbitrary light output part includes a plurality of optical signal components having different wavelengths,
each of the second optical link conversion boards comprising:
a plurality of optical receiving parts arranged at a constant pitch along a third end of the second optical link conversion board and receiving the optical signals output from said light output parts of a corresponding one of said first optical link conversion boards;
optical star coupler means mixing the optical signals output from said optical receiving parts and outputting a mixed optical signal; and
a plurality of wavelength selecting means arranged at a constant pitch along a fourth end of the second optical link conversion board opposite to the third end for receiving the mixed optical signal from said optical star coupler means, each of said wavelength selecting means outputting an optical signal including an optical signal component having a single wavelength,
each of said light output parts of a said first optical link conversion board being coupled to a said optical receiving part of a corresponding one of said second optical link conversion boards.

13. The photonic switching system as claimed in claim 12, wherein said deflection means includes an acousto-optic element which deflects the optical signal from said combiner means in response to the control signal which is dependent on the wavelengths of the optical signal components to be output to the arbitrary light output part.

14. The photonic switching system as claimed in claim 13, wherein said deflection means further includes a lens for converging the deflected optical signal from said acousto-optic element at the arbitrary light output part.

15. The photonic switching system as claimed in claim 12, wherein said combiner means includes a combiner which receives the optical signal components from said wavelength converter elements, an optical amplifier for amplifying an output of said combiner, and a collimator for forming an output of said optical amplifier into parallel light beams.

16. A photonic switching system comprising:
board group made up of a plurality of mutually parallel first optical link conversion boards; and
a second board group made up of a plurality of mutually parallel second optical link conversion boards which are arranged perpendicularly to the first optical link conversion boards of said first board group,
each of the first optical link conversion boards comprising:
a plurality of variable wavelength light emitting elements arranged at a constant pitch along a first end of the optical link conversion board and emitting optical signals having different wavelengths;
combiner means for combining the optical signals received from said light emitting elements into an optical signal which includes optical signal components having a plurality of wavelengths;
a plurality of light output parts arranged at a constant pitch along a second end of said optical link conversion board opposite to the first end; and
deflection means for sequentially deflecting the optical signal from said combiner means to an arbitrary one of said light output parts in response to a control signal so that the optical signal at the arbitrary light output part includes a plurality of optical signal components having different wavelengths,
each of the second optical link conversion boards comprising:
a plurality of optical receiving parts arranged at a constant pitch along a third end of the second optical link conversion board and receiving the optical signals output from said light output parts of a corresponding one of said first optical link conversion boards;
optical star coupler means mixing the optical signals output from said optical receiving parts and outputting a mixed optical signal; and
a plurality of wavelength selecting means arranged at a constant pitch along a fourth end of the second optical link conversion board opposite to the third end for receiving the mixed optical signal from said optical star coupler means, each of said wavelength selecting means outputting an optical signal including an optical signal component having a single wavelength, each of said light output parts of a said first optical link conversion board being coupled to a said optical receiving part of a corresponding one of said second optical link conversion boards.

17. The photonic switching system as claimed in claim 16, wherein said deflection means includes an acousto-optic element which deflects the optical signal from said combiner means in response to the control signal which is dependent on the wavelengths of the optical signal components to be output to the arbitrary light output part.

18. The photonic switching system as claimed in claim 17, wherein said deflection means further includes a lens for converging the deflected optical signal from said acousto-optic element at the arbitrary light output part.

19. The photonic switching system as claimed in claim 16, wherein said combiner means includes a combiner which receives the optical signals from said light emitting elements, an optical amplifier for amplifying an output of said combiner, and a collimator for forming an output of said optical amplifier into parallel light beams.

20. A photonic switching system comprising:
a first board group made up of a plurality of mutually parallel first optical link conversion boards; and
a second board group made up of a plurality of mutually parallel second optical link conversion boards which are arranged perpendicularly to the first optical link conversion boards of said first board group,
each of the first optical link conversion boards comprising:
a plurality of variable wavelength light emitting elements arranged at a constant pitch along a first end of the first optical link conversion board and emitting optical signal components having different wavelengths;
a first optical star coupler mixing the optical signal components emitted from the variable wavelength light emitting elements and outputting a mixed optical signal; and
a plurality of multi-wavelength selective filters arranged at a constant pitch along a second end of the first optical link conversion board opposite to the first end and receiving the mixed optical signal from said first optical star coupler, each of the multi-wavelength selective filters selectively outputting an optical signal which includes optical signal components having desired wavelengths out of wavelengths included in the optical signal components making up the mixed optical signal, each of said second optical link conversion boards comprising:
a plurality of optical receiving parts arranged at a predetermined pitch along a third end of the second optical link conversion board and receiving the optical signals output from said multi-wavelength selective filters of a corresponding one of said first optical link conversion board;
a second optical star coupler mixing the optical signals output from the optical receiving parts and outputting a mixed optical signal; and
a plurality of wavelength selecting means arranged at a constant pitch along a fourth end of the second optical link conversion board opposite to the third end for receiving the mixed optical signal from said second optical star coupler, each of said wavelength selecting means outputting an optical signal having a single wavelength,
each of said multi-wavelength selective filters of a said first optical link conversion board being coupled to a said optical receiving part of a corresponding one of said second optical link conversion boards.

21. The photonic switching system as claimed in claim 20, wherein said multi-wavelength selective filter comprises a third optical star coupler which drops the mixed optical signal received from said first optical star coupler and outputs optical signals, a plurality of wavelength selecting elements which receive the optical signals from said third optical star coupler and respectively output an optical signal component having a single wavelength, and a fourth optical star coupler which receives the optical signal components from said wavelength selecting elements and outputs the optical signal which includes the desired wavelength components.

22. The photonic switching system as claimed in claim 20, wherein said multi-wavelength selective filter comprises a plurality of eliminating means respectively for eliminating an optical signal component having a specific wavelength, a plurality of switching means respectively coupled to a corresponding one of said eliminating means for passing an optical signal as it is or through the corresponding eliminating means in response to a control signal, and control means for controlling switching of said switching means by supplying the control signal to each of said switching means, said switching means being coupled in series in n stages and receiving the optical signal from said optical star coupler means at the switching means in a first stage and outputting the optical signal which includes the optical signal components having the desired wavelength components from the switching means in an nth stage.

* * * * *